United States Patent
Lototskiy

(10) Patent No.: US 10,169,575 B1
(45) Date of Patent: Jan. 1, 2019

(54) SYSTEMS AND METHODS FOR PREVENTING INTERNAL NETWORK ATTACKS

(75) Inventor: Alexander Lototskiy, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 704 days.

(21) Appl. No.: 13/420,574

(22) Filed: Mar. 14, 2012

(51) Int. Cl.
   *G06F 21/55*     (2013.01)
   *H04L 29/06*    (2006.01)

(52) U.S. Cl.
   CPC ............ *G06F 21/55* (2013.01); *G06F 21/554* (2013.01); *H04L 63/14* (2013.01); *H04L 63/145* (2013.01); *H04L 63/1441* (2013.01)

(58) Field of Classification Search
   CPC ... H04L 63/14; H04L 63/1441; H04L 63/145; G06F 21/55; G06F 21/554
   USPC .................................................. 726/1, 22, 23
   See application file for complete search history.

(56) References Cited

U.S. PATENT DOCUMENTS

| 5,440,723 | A  | * | 8/1995  | Arnold et al. ..................... 714/2 |
| 6,611,869 | B1 | * | 8/2003  | Eschelbeck et al. ......... 709/228 |
| 2002/0009079 | A1 | * | 1/2002  | Jungck et al. ................ 370/389 |
| 2003/0105976 | A1 | * | 6/2003  | Copeland, III ............... 713/201 |
| 2006/0070130 | A1 | * | 3/2006  | Costea et al. .................... 726/24 |
| 2006/0256729 | A1 | * | 11/2006 | Chen ................... H04L 63/1408 370/250 |
| 2008/0178294 | A1 | * | 7/2008  | Hu ........................ G06F 21/552 726/24 |
| 2008/0250473 | A1 | * | 10/2008 | Massimiliano ........... G06F 8/61 726/1 |

\* cited by examiner

*Primary Examiner* — Ellen Tran
(74) *Attorney, Agent, or Firm* — Fisher Broyles, LLP

(57) ABSTRACT

A computer-implemented method for preventing internal network attacks may include 1) identifying a host system that is within a subnet of a network, 2) detecting an intrusion on the host system, the intrusion on the host system being capable of facilitating an attack via the host system on at least one additional system of the network, 3) identifying at least one additional host system within the subnet of the network, and 4) implementing a security measure on the additional host system to prevent the attack based at least in part on detecting the intrusion and at least in part on the host system and additional host system being within the subnet. Various other methods, systems, and computer-readable media are also disclosed.

20 Claims, 6 Drawing Sheets

SYSTEMS AND METHODS FOR PREVENTING INTERNAL NETWORK ATTACKS

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Once a network is compromised, the network may become more vulnerable to further attacks. For example, internal security barriers (e.g., between systems on the network) may be lower than security barriers between the network and outside networks. Accordingly, once an attacker has breached the network, further attacks may be launched from within the network. For example, an attacker may infect additional host systems within the network and/or access sensitive data that is stored within the network. Accordingly, the instant disclosure identifies and addresses a need for additional and improved systems and methods for preventing internal network attacks.

SUMMARY

As will be described in greater detail below, the instant disclosure generally relates to systems and methods for preventing internal network attacks by identifying intrusions on host systems within subnets that may facilitate additional attacks and implementing security measures in response to the intrusions. In one example, a computer-implemented method for preventing internal network attacks may include 1) identifying a host system that is within a subnet of a network, 2) detecting an intrusion on the host system, the intrusion on the host system being capable of facilitating an attack via the host system on at least one additional system of the network, 3) identifying at least one additional host system within the subnet of the network, and 4) implementing a security measure on the additional host system to prevent the attack based at least in part on detecting the intrusion and at least in part on the host system and additional host system being within the subnet.

In some examples, the subnet may include a plurality of host systems connected to the network via a gateway, the gateway including at least one security feature for obstructing the attack across the gateway.

In some embodiments, detecting the intrusion may include receiving a message form an endpoint agent on the host system identifying the intrusion. In these embodiments, implementing the security measure may include transmitting an instruction to an additional endpoint agent on the additional host to implement the security measure.

In one example, detecting the intrusion on the host system may include determining that the intrusion cannot be automatically remediated by a security system. In this example, the computer-implemented method may also include alerting an administrator of the intrusion. Furthermore, in this example, implementing the security measure may include preventing the attack until the intrusion is remediated.

In some examples, implementing the security measure may include transmitting an instruction to an additional endpoint agent on the additional host to implement the security measure. Additionally or alternatively, implementing the security measure may include performing a scan for malware on the additional host system. In some embodiments, implementing the security measure may include adding a firewall restriction to the additional host system. In one example, implementing the security measure may include relocating a security endpoint agent on the additional host system to a secure location.

In some embodiments, the computer-implemented method may further include 1) identifying a server on the network configured with a first security policy for server transactions not originating from the subnet and a second security policy for server transactions originating from the subnet and 2) modifying the second security policy to add at least one restriction on server transactions based at least in part on detecting the intrusion.

In one embodiment, a system for implementing the above-described method may include 1) an identification module programmed to identify a host system that is within a subnet of a network, 2) a detection module programmed to detect an intrusion on the host system, the intrusion on the host system being capable of facilitating an attack via the host system on at least one additional system on the network, 3) a subnet module programmed to identify at least one additional host system within the subnet of the network, and 4) an implementation module programmed to implement a security measure on the additional host system to prevent the attack based at least in part on detecting the intrusion and at least in part on the host system and additional host system being within the subnet. The system may also include at least one processor configured to execute the identification module, the detection module, the subnet module, and the implementation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a host system that is within a subnet of a network, 2) detect an intrusion on the host system, the intrusion on the host system being capable of facilitating an attack via the host system on at least one additional system of the network, 3) identify at least one additional host system within the subnet of the network, and 4) implement a security measure on the additional host system to prevent the attack based at least in part on detecting the intrusion and at least in part on the host system and additional host system being within the subnet.

As will be explained in greater detail below, by identifying intrusions on host systems within subnets that may facilitate additional attacks and implementing security measures in response to the intrusions, the systems and methods described herein may protect network resources against further intrusions, even when the original intrusions cannot immediately be eliminated (e.g., due to requiring the input of an administrator).

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
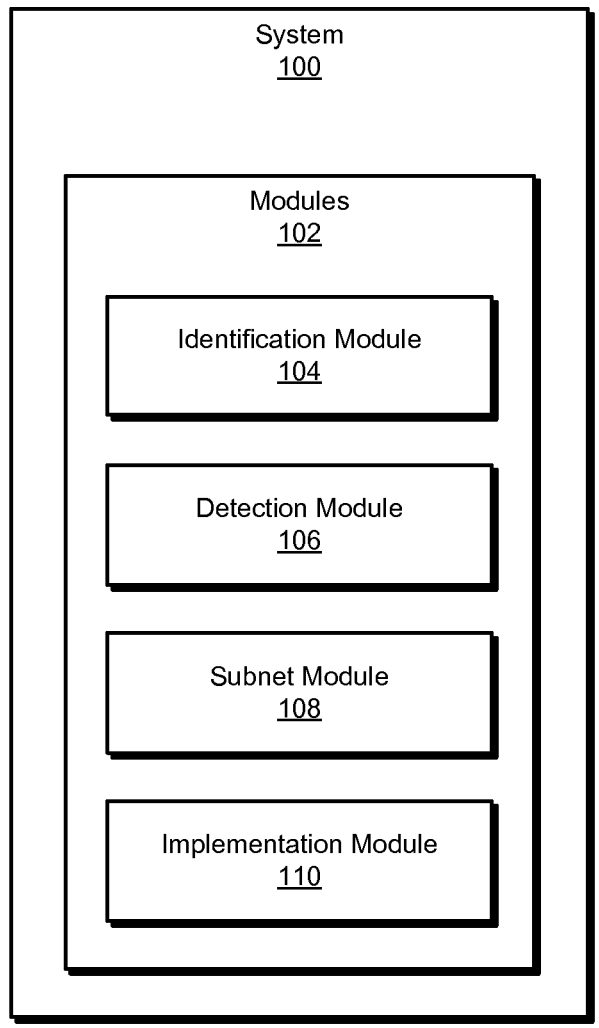
FIG. 1 is a block diagram of an exemplary system for preventing internal network attacks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
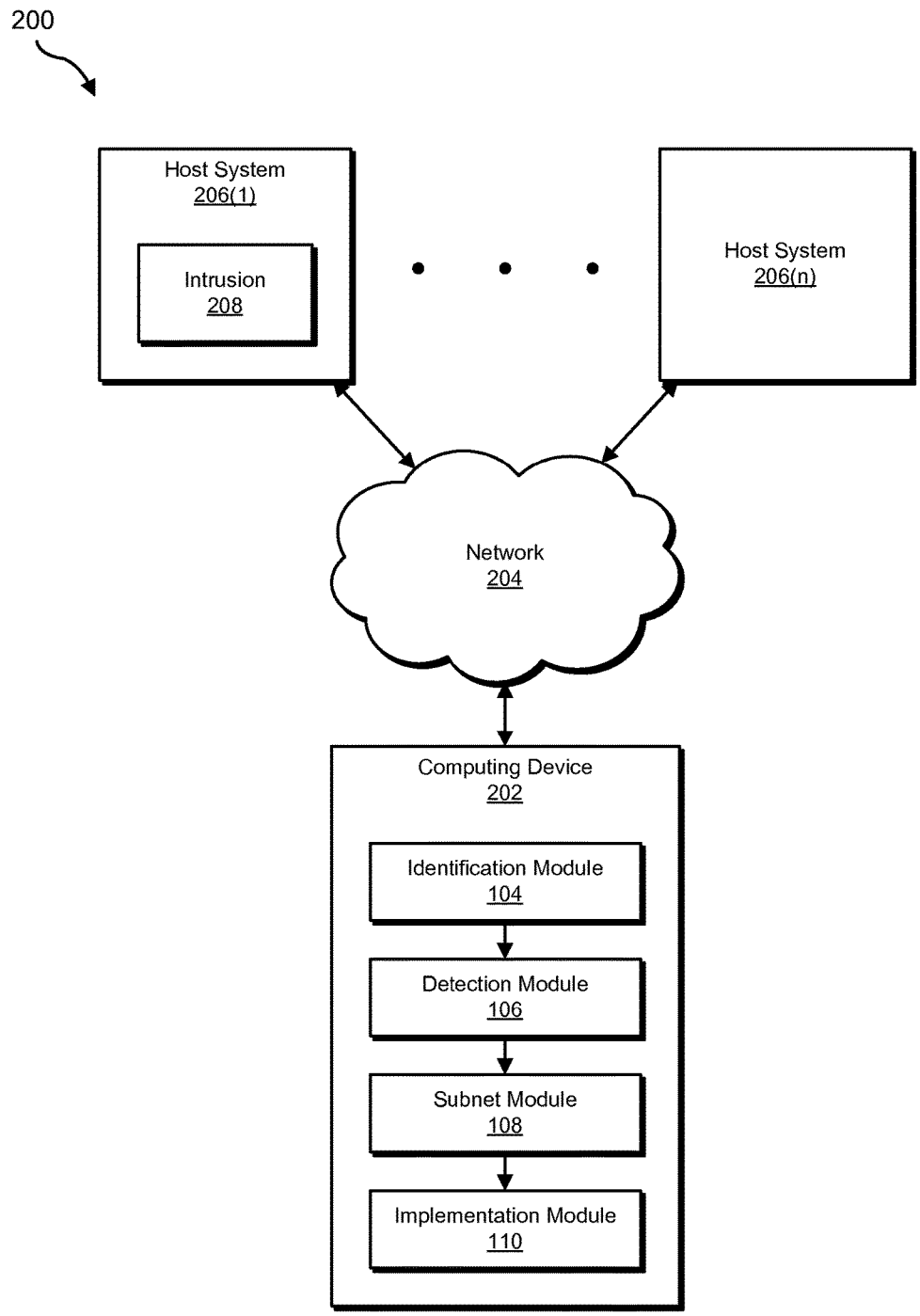
FIG. 2 is a block diagram of an exemplary system for preventing internal network attacks.
Figure 3:
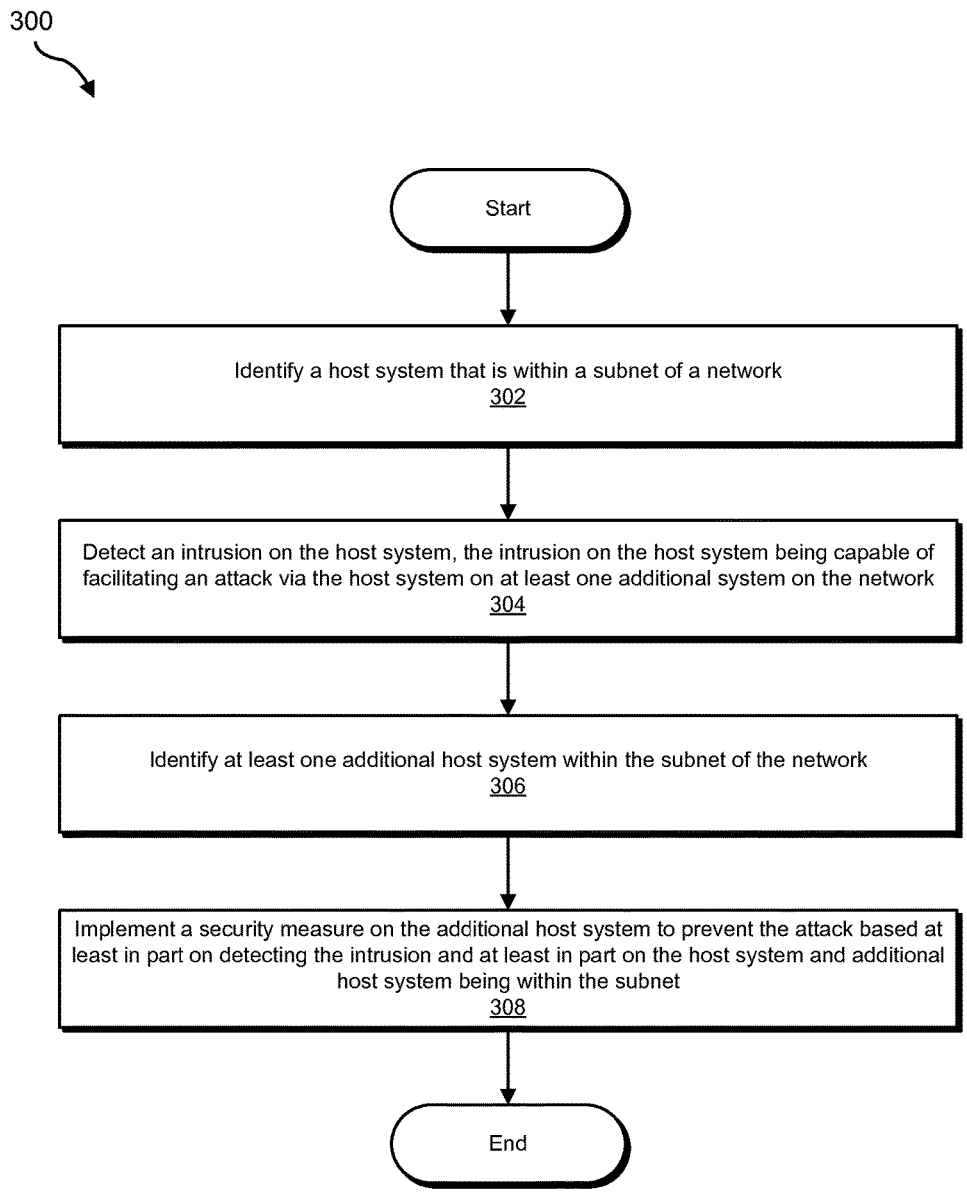
FIG. 3 is a flow diagram of an exemplary method for preventing internal network attacks.
Figure 4:
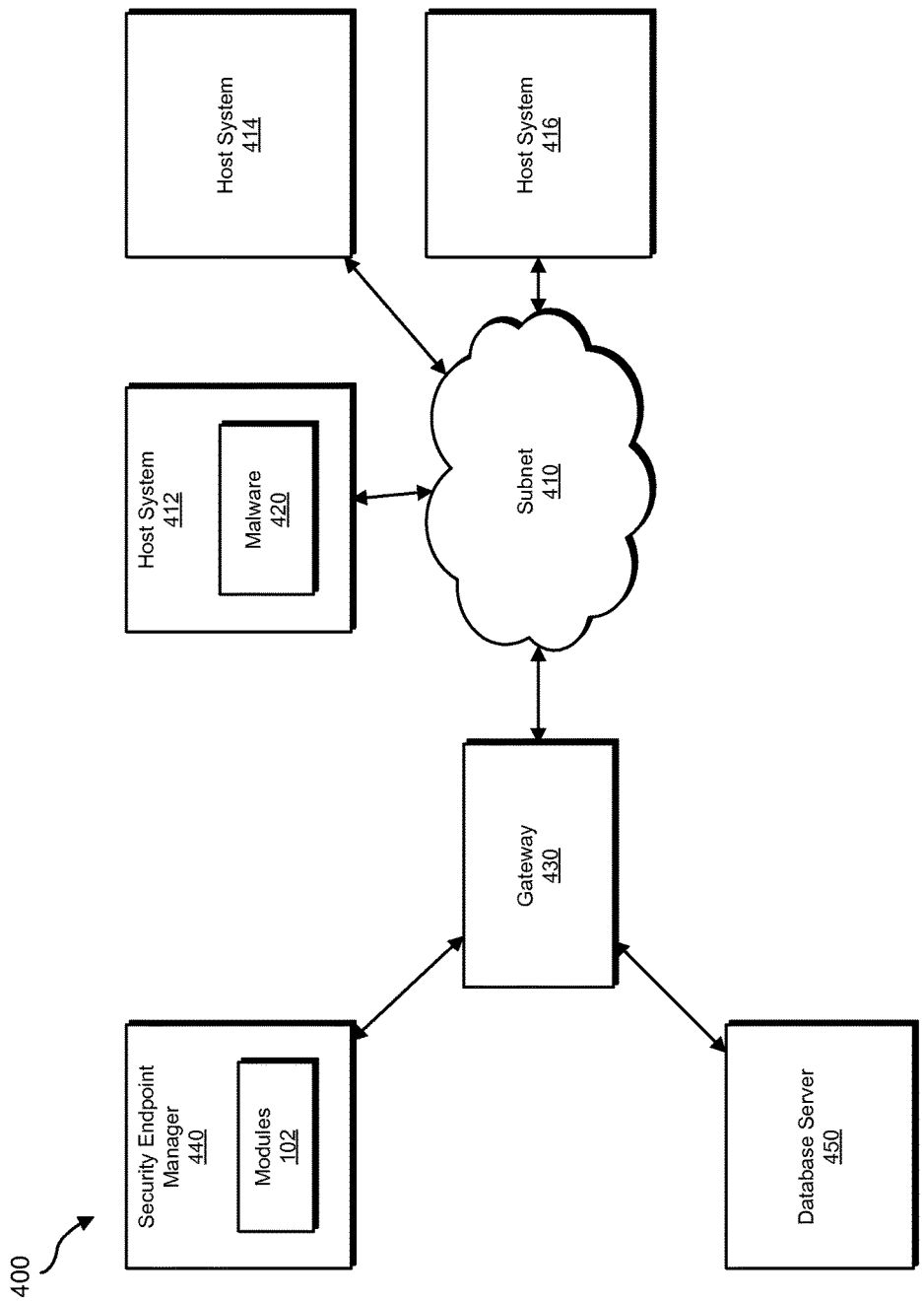
FIG. 4 is a block diagram of an exemplary system for preventing internal network attacks.

The following will provide, with reference to FIGS. 1, 2, and 4, detailed descriptions of exemplary systems for preventing internal network attacks. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for preventing internal network attacks. As illustrated in this figure, exemplary system 100 may include one or more modules 102 for performing one or more tasks. For example, and as will be explained in greater detail below, exemplary system 100 may include an identification module 104 programmed to identify a host system that is within a subnet of a network. Exemplary system 100 may also include a detection module 106 programmed to detect an intrusion on the host system, the intrusion on the host system being capable of facilitating an attack via the host system on at least one additional system on the network.

In addition, and as will be described in greater detail below, exemplary system 100 may include a subnet module 108 programmed to identify at least one additional host system within the subnet of the network. Exemplary system 100 may also include an implementation module 110 programmed to implement a security measure on the additional host system to prevent the attack based at least in part on detecting the intrusion and at least in part on the host system and additional host system being within the subnet. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and host systems 206(1)-(n)), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with host systems 206(1)-(n) via a network 204 (e.g., to manage endpoint security agents on host systems 206(1)-(n)).

In one embodiment, one or more of modules 102 from FIG. 1 may, when executed by at least one processor of computing device 202, facilitate computing device 202 in preventing internal network attacks. For example, and as will be described in greater detail below, one or more of identification module 104, detection module 106, subnet module 108, and implementation module 110 may cause computing device 202 to 1) identify host system 206(1) within a subnet of network 204, 2) detect an intrusion 208 on host system 206(1), intrusion 208 on host system 206(1) being capable of facilitating an attack via host system 206(1) on at least one additional system of network 204, 3) identify at least one additional host system within the subnet of network 204 (e.g., host system 206(n)), and 4) implement a security measure on the host system 206(n) to prevent the attack based at least in part on detecting intrusion 208 and at least in part on host system 206(1) and host system 206(n) being within the subnet.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Host systems 206(1)-(n) generally represent any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and host systems 206(1)-(n).

FIG. 3 is a flow diagram of an exemplary computer-implemented method 300 for preventing internal network attacks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a host system that is within a subnet of a network. For example, at step 302 identification module 104 may, as part of computing device 202 in FIG. 2, identify host system 206(1) within a subnet of network 204.

As used herein, the phrase "host system" may refer to any computing system capable of connecting to a network. As used herein, the term "subnet" may refer to any subdivision of a network that is configured to communicate with other computing systems and/or devices outside the subdivision via a networking device (e.g., a router and/or gateway). For example, the subnet may include a plurality of host systems connected to the network via a gateway, the gateway including at least one security feature for obstructing an attack across the gateway. As used herein, the term "gateway" may refer to any networking device capable of connecting a subnet to a network. For example, the term "gateway" may refer to a gateway device and/or a router. The security feature for obstructing the attack may include any of a variety of security features, including a firewall, an intrusion prevention system (e.g., configured to check network traffic for signatures of exploits, configured to check network traffic for unusual activity, etc.).

Identification module 104 may identify the host system in any suitable manner. For example, as will be explained in greater detail below, one or more of the systems described herein may receive a message from an endpoint agent on the host system identifying an intrusion on the host system. Accordingly, identification module 104 may identify the host system by receiving the message from the host system. Additionally or alternatively, identification module 104 may identify the host system by identifying a configuration specifying that an endpoint agent operates on the host system. In some examples, identification module 104 may identify the host system by executing on the host system. Additionally or alternatively, identification module 104 may identify the host system by receiving a message from another system on the network identifying the host system.

FIG. 4 illustrates an exemplary system 400 for preventing internal network attacks. As shown in FIG. 4, exemplary system 400 may include a subnet 410 connecting host systems 412, 414, and 416. Exemplary system 400 may also include a gateway 430 connecting subnet 410 with a security endpoint manager 440 and a database server 450. Using FIG. 4 as an example, at step 302 identification module 104 may, as a part of modules 102 on security endpoint manager 440, identify host system 412 (e.g., by receiving a message from host system 412).

Returning to FIG. 3, at step 304 one or more of the systems described herein may detect an intrusion on the host system, the intrusion on the host system being capable of facilitating an attack via the host system on at least one additional system of the network. For example, at step 304 detection module 106 may, as part of computing device 202 in FIG. 2, detect intrusion 208 on host system 206(1), intrusion 208 on host system 206(1) being capable of facilitating an attack via host system 206(1) on at least one additional system of network 204.

As used herein, the term "intrusion" may refer to any malware installation, exploit, and/or attack that may modify the operation of a host system. As used herein, the term "malware" may refer to any virus, worm, Trojan horse, spyware, and/or any other malicious, illegitimate, and/or unauthorized software. As used herein, the term "attack" may refer to any attempt to perform a malware installation, an exploit, an unauthorized use of computing resources, and/or an unauthorized access of data.

In some examples, detection module 106 may detect the intrusion by receiving a message from an endpoint agent on the host system identifying the intrusion. As used herein, the phrase "endpoint agent" may refer to any collection of modules, software, and/or executable code that may be programmed and/or configured to facilitate the security of a host system. For example, the endpoint agent may include an anti-malware system, a firewall system, and/or an intrusion prevention system. In some examples, the endpoint agent may be configurable by and/or may report to a security endpoint management system.

In addition to detecting the intrusion, in some examples detection module 106 may determine that the intrusion cannot be automatically remediated by a security system. For example, detection module 106 may receive a message from an endpoint agent that the endpoint agent cannot remove malware from the host system and/or cannot stop an intrusion and/or repair an exploit. For example, the endpoint agent may require further input before proceeding with a remediation and/or may be unable to eliminate the intrusion with certainty and/or without adverse effects to the host system. In these examples, one or more of the systems described herein (e.g., detection module 106) may alert an administrator of the intrusion.

In some examples, detection module 106 may detect the intrusion by detecting and/or receiving a message about a means of the intrusion (e.g., by receiving a message about a malware installation). Additionally or alternatively, detection module 106 may detect the intrusion by detecting and/or receiving a message about an effect of the intrusion (e.g., unexpected and/or adverse behavior on the host system).

Using FIG. 4 as an example, at step 304 detection module 106 may, as a part of modules 102 on security endpoint manager 440, receive a message from host system 412 identifying malware 420 (and, e.g., an indication that an endpoint agent on host system 412 cannot automatically remove malware 420).

Returning to FIG. 3, at step 306 one or more of the systems described herein may identify at least one additional host system within the subnet of the network. For example, at step 306 subnet module 108 may, as part of computing device 202 in FIG. 2, identify at least one additional host system within the subnet of network 204 (e.g., host system 206(n)).

Subnet module 108 may identify the additional host system in any suitable manner. For example, subnet module 108 may identify the additional host system by identify a network topology of the network and determining that the additional host system is within the same subnet as the host system. Additionally or alternatively, subnet module 108 may identify the additional host system by identifying a security endpoint agent on the additional host system. In some examples, subnet module 108 may identify the additional host system by reading a configuration file that identifies the additional host system.

In some examples, subnet module 108 may identify every host system within the subnet. As will be described in greater detail below, the other host systems in the subnet may be vulnerable to an attack from the host system due to the intrusion.

Using FIG. 4 as an example, at step 306 subnet module 108 may identify host system 414 and host system 416 as belonging to the same subnet 410 as host system 412.

Returning to FIG. 3, at step 308 one or more of the systems described herein may implement a security measure on the additional host system to prevent the attack based at least in part on detecting the intrusion and at least in part on the host system and additional host system being within the subnet. For example, at step 308 implementation module 110 may, as part of computing device 202 in FIG. 2, implement a security measure on the host system 206($n$) to prevent the attack based at least in part on detecting intrusion 208 and at least in part on host system 206(1) and host system 206($n$) being within the subnet.

As used herein, the phrase "security measure" may refer to any policy, configuration, and/or command for preventing and/or hindering an attack.

In some examples, implementation module 110 may perform a scan for malware on the additional host system. Additionally or alternatively, implementation module 110 may increase the aggressiveness of a malware detection policy on the additional host system (e.g., to use more computing resources in scanning for malware, to more aggressively identify software as malware at the potential cost of more false positives, etc.). In some examples, implementation module 110 may scan for a malware type matching malware identified on the host system.

As another example of the security measure, implementation module 110 may add a firewall restriction to the additional host system. As used herein, the phrase "firewall restriction" may refer to any policy, rule, and/or configuration for controlling, filtering, blocking, and/or allowing network traffic. In some examples, a firewall restriction may identify one or more computing devices, network addresses, and/or network devices. For example, implementation module 110 may add a firewall restriction to the additional host system that regulates network traffic from the host system. Additionally or alternatively, implementation module 110 may add a firewall restriction to the additional host system that regulates network traffic from within the subnet to the additional host system.

In some examples, implementation module 110 may relocate a security endpoint agent on the additional host system to a secure location. For example, implementation module 110 may relocate the security endpoint agent to a location on the network that may not be reached by an attack from the host system.

Implementation module 110 may implement the security measure to any of a variety of ends. For example, implementation module 110 may implement the security measure to prevent the attack until the intrusion is remediated. Additionally or alternatively, implementation module 110 may implement the security measure to reverse an attack already performed on the additional host system. In some examples, implementation module 110 may implement the security measure to prevent an attack from the additional host system to another system on the network.

Implementation module 110 may implement the security measure in any suitable manner. For example, implementation module 110 may implement the security measure by transmitting an instruction to an additional endpoint agent on the additional host to implement the security measure. As mentioned earlier, in some examples, subnet module 108 may identify each host system on the subnet (excepting and/or including the host system with the intrusion). Accordingly, implementation module 110 may broadcast the instruction to each host system on the subnet.

In some examples, one or more of the systems may also protect a system on the network but not within the subnet. For example, implementation module 110 may identify a server on the network configured with a first security policy for server transactions not originating from the subnet (e.g., server transactions originating from outside the network) and a second security policy for server transactions originating from the subnet (e.g., server transactions originating from within the network). The server may perform any of a variety of transactions. For example, the server may include a database server configured to provide access to data. In some examples, the first security policy may disallow and/or limit transactions that are allowed by the second security policy. In some examples, the second security policy may simply represent an absence of the first security policy. As used herein, the phrase "security policy" may refer to any policy, configuration, rule, filter, permission setting, firewall, default, and/or behavior capable of configuring and/or controlling transactions with a computing system.

Upon identifying the server, implementation module 110 may modify the second security policy to add at least one restriction on server transactions based at least in part on detecting the intrusion. For example, implementation module 110 may modify the second security policy to disallow a certain set of server transactions (e.g., access to sensitive data) initiated from the subnet and/or within the network. In some examples, implementation module 110 may modify the second security policy by replacing the second security policy and/or adding a policy to constitute to the second security policy.

As explained above, by identifying intrusions on host systems within subnets that may facilitate additional attacks and implementing security measures in response to the intrusions, the systems and methods described herein may protect network resources against further intrusions, even when the original intrusions cannot immediately be eliminated (e.g., due to requiring the input of an administrator).

Figure 5:
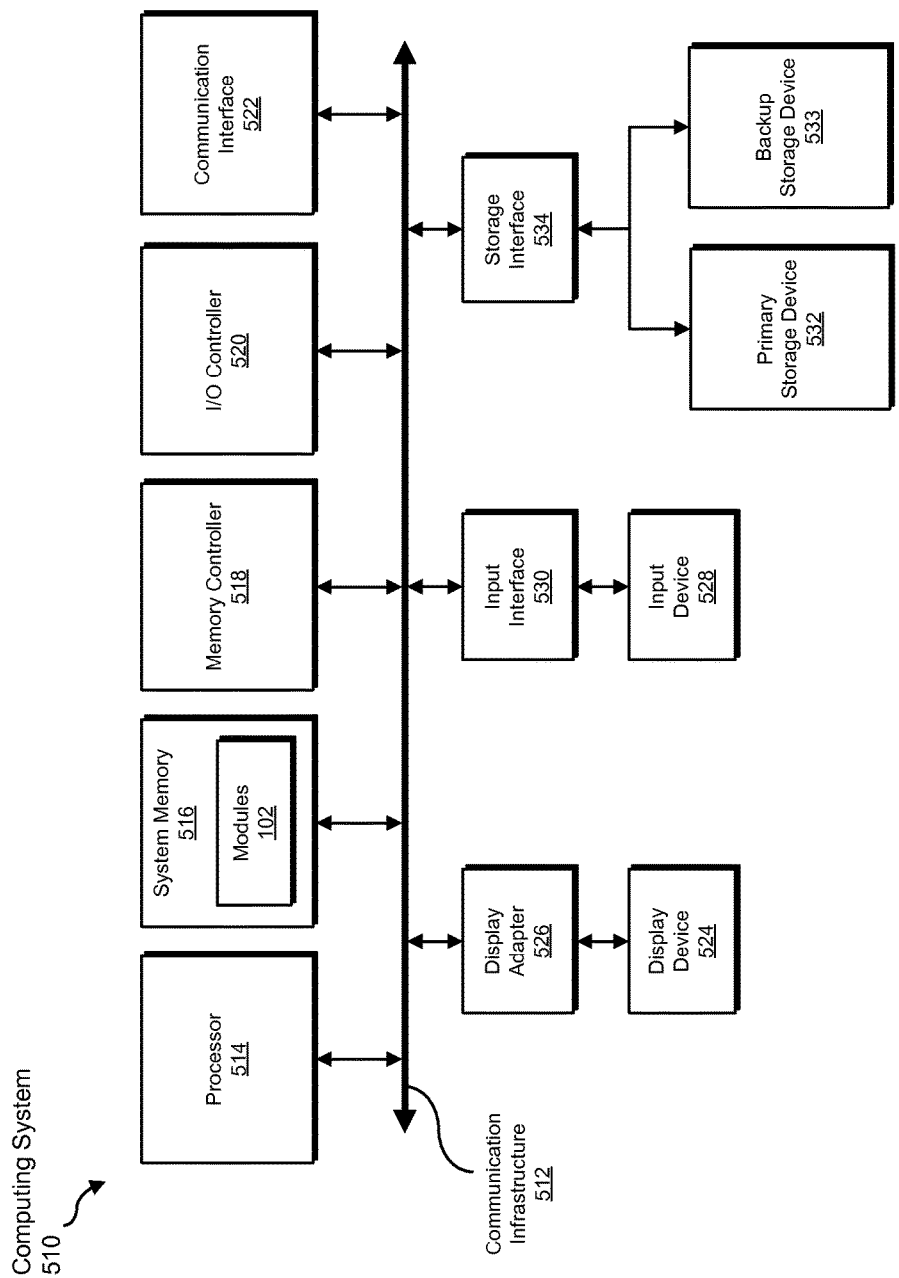
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, detecting, determining, alerting, implementing, relocating, performing, adding, preventing, and modifying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
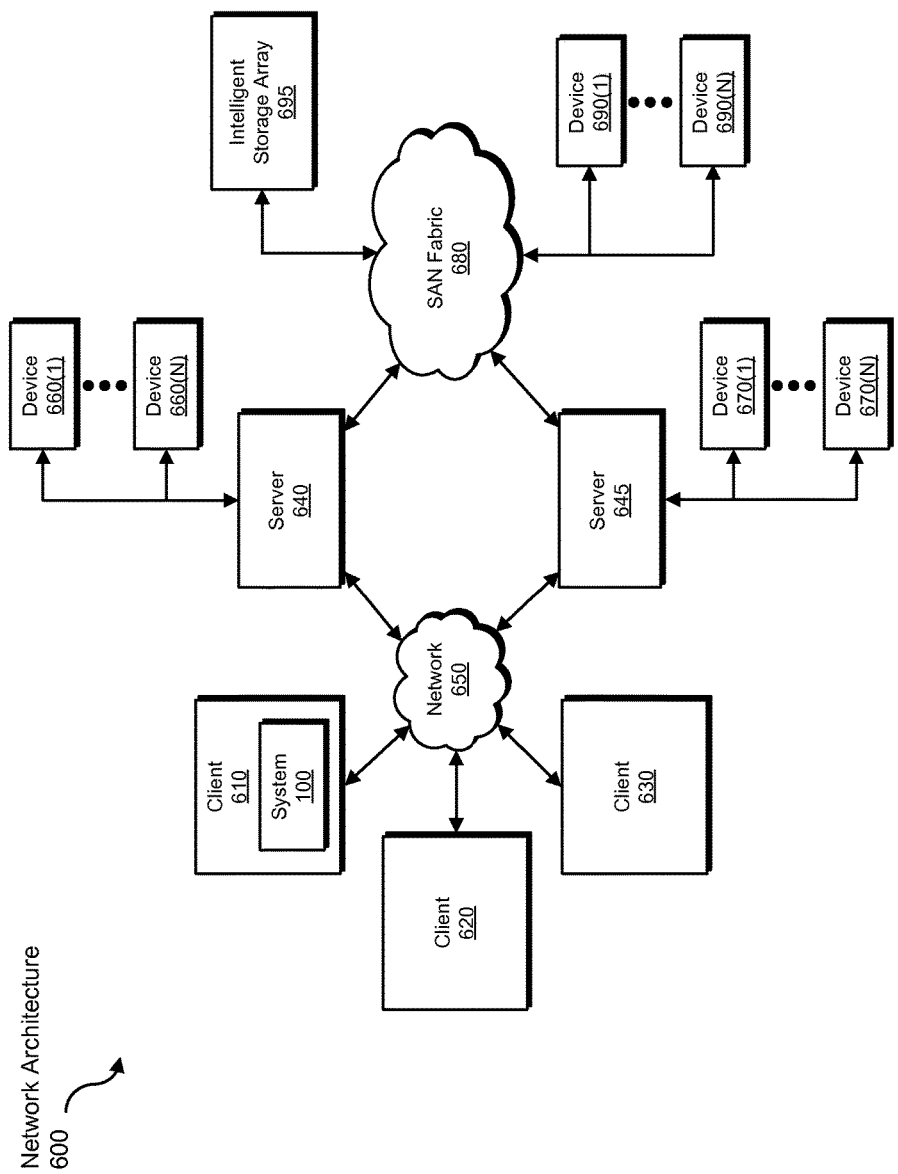
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, detecting, determining, alerting, implementing, relocating, performing, adding, preventing, and modifying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for preventing internal network attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for preventing internal network attacks. As another example, one or more of the modules recited herein may transform a network into a secure network.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preventing internal network attacks, at least a portion of the method being performed by a computing device comprising at least one processor, the method comprising:
   identifying a subnet of a network, the subnet comprising at least an endpoint host system and an additional endpoint host system;
   detecting an intrusion on the endpoint host system, the intrusion on the endpoint host system having bypassed a security feature implemented on a gateway for obstructing attacks across the gateway on systems within the subnet from outside the subnet and thus having breached the network into the subnet and thus being capable of facilitating an internal network attack via the endpoint host system on another endpoint system within the subnet;
   implementing a security measure on the additional endpoint host system to prevent the internal network attack based at least in part on detecting the intrusion that breached the network into the subnet and at least in part on the endpoint host system and additional endpoint host system being within the subnet,
   wherein the security measure comprises a firewall restriction that is implemented on the additional endpoint host system and that regulates network traffic within the subnet between the endpoint host system and the additional endpoint host system, the firewall restriction is implemented by an agent on the additional endpoint host system, thereby employing resources of the additional endpoint host system to prevent the internal network attack beyond resources provided by the endpoint host system and the gateway, and
   wherein implementing the security measure comprises increasing an aggressiveness of a malware detection policy on the additional endpoint host system and performing a scan for malware on the additional endpoint host system based on the malware detection policy.

2. The computer-implemented method of claim 1, wherein:
   detecting the intrusion comprises receiving a message from an endpoint agent on the endpoint host system identifying the intrusion;
   implementing the security measure comprises transmitting an instruction to an additional endpoint agent on the additional endpoint host system to implement the security measure.

3. The computer-implemented method of claim 1,
   wherein implementing the security measure comprises relocating a security endpoint agent on the additional endpoint host system to a secure location.

4. The computer-implemented method of claim 1, wherein implementing the security measure comprises adding the firewall restriction to the additional endpoint host system.

5. The computer-implemented method of claim 1, further comprising:
   identifying a server on the network configured with a first security policy for server transactions not originating from the subnet and a second security policy for server transactions originating from the subnet;
   modifying the second security policy to add at least one restriction on server transactions based at least in part on detecting the intrusion.

6. The computer-implemented method of claim 1, wherein the subnet comprises a plurality of host systems connected to the network via the gateway, the gateway comprising the security feature for obstructing the intrusion across the gateway.

7. The computer-implemented method of claim 1:
   wherein detecting the intrusion comprises determining that the intrusion cannot be automatically remediated by a security system:
   further comprising alerting an administrator of the intrusion;
   wherein implementing the security measure comprises preventing the internal network attack until the intrusion is remediated.

8. The computer-implemented method of claim 1, wherein: an internal security barrier between host systems in the subnet differs from an external security barrier between the subnet and an outside network;

the intrusion facilitates the internal network attack on the additional endpoint host system by enabling the internal network attack to be launched from within the subnet rather than being subjected to the external security barrier.

9. The computer-implemented method of claim 1, wherein increasing the aggressiveness of the malware detection policy causes the additional endpoint host system to increase usage of the resources of the additional endpoint host system to scan for malware.

10. The computer-implemented method of claim 1, wherein performing the scan for malware comprises scanning for a malware type matching malware identified on the endpoint host system.

11. A system for preventing internal network attacks, the system comprising:
an identification module programmed to identify a subnet of a network, the subnet comprising at least an endpoint host system and an additional endpoint host system;
a detection module programmed to detect an intrusion on the endpoint host system, the intrusion on the endpoint host system having bypassed a security feature implemented on a gateway for obstructing attacks across the gateway on systems within the subnet from outside the subnet and thus having breached the network into the subnet and thus being capable of facilitating an internal network attack via the endpoint host system on another endpoint system within the subnet;
an implementation module programmed to implement a security measure on the additional endpoint host system to prevent the internal network attack based at least in part on detecting the intrusion that breached the network into the subnet and at least in part on the endpoint host system and additional endpoint host system being within the subnet, wherein the security measure comprises a firewall restriction that is implemented on the additional endpoint host system and that regulates network traffic within the subnet between the endpoint host system and the additional endpoint host system, the firewall restriction is implemented by an agent on the additional endpoint host system, thereby employing resources of the additional endpoint host system to prevent the internal network attack beyond resources provided by the endpoint host system and the gateway, and implementing the security measure comprises increasing an aggressiveness of a malware detection policy on the additional endpoint host system and performing a scan for malware on the additional endpoint host system based on the malware detection policy;
at least one processor configured to execute the identification module, the detection module, and the implementation module.

12. The system of claim 11, wherein: the detection module is programmed to detect the intrusion by receiving a message from an endpoint agent on the endpoint host system identifying the intrusion:
the implementation module is programmed to implement the security measure by transmitting an instruction to an additional endpoint agent on the additional endpoint host system to implement the security measure.

13. The system of claim 11, wherein the implementation module is programmed to implement the security measure by relocating a security endpoint agent on the additional endpoint host system to a secure location.

14. The system of claim 11, wherein the implementation module is programmed to implement the security measure by adding the firewall restriction to the additional endpoint host system.

15. The system of claim 11, wherein the implementation module is further programmed to:
identifying a server on the network configured with a first security policy for server transactions not originating from the subnet and a second security policy for server transactions originating from the subnet;
modifying the second security policy to add at least one restriction on server transactions based at least in part on detecting the intrusion.

16. The system of claim 11, wherein the subnet comprises a plurality of host systems connected to the network via the gateway, the gateway comprising the security feature for obstructing the intrusion across the gateway.

17. The system of claim 11, wherein:
the detection module is programmed to determine that the intrusion cannot be automatically remediated by a security system;
the implementation module is further programmed to alert an administrator of the intrusion;
the implementation module is programmed to implement the security measure by preventing the internal network attack until the intrusion is remediated.

18. A non-transitory computer-readable-storage medium comprising one or more computer-executable instructions that, when executed by at least one processor of a computing device, cause the computing device to:
identify a subnet of a network, the subnet comprising at least an endpoint host system and an additional endpoint host system;
detect an intrusion on the endpoint host system, the intrusion on the endpoint host system having bypassed a security feature implemented on a gateway for obstructing attacks across the gateway on systems within the subnet from outside the subnet and thus having breached the network into the subnet and thus being capable of facilitating an internal network attack via the endpoint host system on another endpoint system within the subnet;
implement a security measure on the additional endpoint host system to prevent the internal network attack based at least in part on detecting the intrusion that breached the network into the subnet and at least in part on the endpoint host system and additional endpoint host system being within the subnet,
wherein the security measure comprises a firewall restriction that regulates network traffic within the subnet between the endpoint host system and the additional endpoint host system, the firewall restriction is implemented by an agent on the additional endpoint host system, thereby employing resources of the additional endpoint host system to prevent the internal network attack beyond resources provided by the endpoint host system and the gateway, and
wherein implementing the security measure comprises increasing an aggressiveness of a malware detection policy on the additional endpoint host system and performing a scan for malware on the additional endpoint host system based on the malware detection policy.

19. The computer-readable-storage medium of claim 18, wherein:
the one or more computer-executable instructions cause the computing device to detect the intrusion by causing the computing device to receive a message from an endpoint agent on the endpoint host system identifying the intrusion;

the one or more computer-executable instructions cause the computing device to implement the security measure by causing the computing device to transmit an instruction to an additional endpoint agent on the additional endpoint host system to implement the security measure.

20. The computer-readable-storage medium of claim 18, wherein the one or more computer-executable instructions cause the computing device to implement the security measure by causing the computing device to relocate a security endpoint agent on the additional endpoint host system to a secure location.

* * * * *